United States Patent [19]

Matrick et al.

[11] Patent Number: 5,180,425
[45] Date of Patent: Jan. 19, 1993

[54] AQUEOUS INK JET INKS CONTAINING POLYOL/ALKYLENE OXIDE CONDENSATES AS COSOLVENTS

[75] Inventors: Howard Matrick, Highlands, N.J.; Michele E. Shepard, Escondido; Young S. You, Los Altos, both of Calif.

[73] Assignee: E. I. Du Pont de Nemours and Company, Wilmington, Del.

[21] Appl. No.: 788,141

[22] Filed: Nov. 5, 1991

[51] Int. Cl.$^5$ ............... C09D 11/00; C08K 5/00
[52] U.S. Cl. .................. 106/22 R; 106/20 D; 106/499; 526/190
[58] Field of Search ..................... 106/20–22

[56] References Cited

U.S. PATENT DOCUMENTS

| | | | |
|---|---|---|---|
| 4,280,813 | 7/1981 | DeGoler | 8/404 |
| 4,431,450 | 2/1984 | Hasegawa et al. | 106/21 |
| 4,508,880 | 4/1985 | Webster | 526/190 |
| 4,923,515 | 5/1990 | Koike et al. | 106/22 |
| 4,986,850 | 1/1991 | Iwata et al. | 106/25 |
| 5,085,698 | 2/1992 | Ma et al. | 106/20 |
| 5,190,166 | 5/1991 | Schwartz | 106/22 |

FOREIGN PATENT DOCUMENTS

2-103274  4/1990  Japan .

*Primary Examiner*—William R. Dixon, Jr.
*Assistant Examiner*—Margaret Einsmann

[57] ABSTRACT

An ink for ink jet printers which comprises an aqueous carrier medium, pigment dispersion or dye and a polyol/alkylene oxide condensate cosolvent which eliminates film formation on thermal ink jet resistor surfaces thereby eliminating non-uniformity in optical density. The cosolvent present at least 5% has a solubility in water of at least 4.5 parts in 100 parts of water at 25° C. and a general formula:

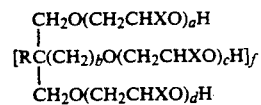

wherein
X = —H or —CH$_3$;
R = —H, —CH$_3$, —C$_2$H$_5$, —C$_3$H$_7$, —C$_4$H$_9$, or —CH$_2$O(CH$_2$CH$_2$O)$_e$H;
b = 0 or 1,
a + d + f(c + e) = 2 − 100; and
f = 1 − 6, the cosolvent being present in the amount of at least 4.5% based on the total weight of the ink jet ink composition. These inks exhibit freedom from thermal resistor film formation, have excellent decap performance, are storage stable and give images having excellent print quality.

43 Claims, No Drawings

AQUEOUS INK JET INKS CONTAINING POLYOL/ALKYLENE OXIDE CONDENSATES AS COSOLVENTS

FIELD OF THE INVENTION

This invention relates to aqueous inks for ink jet printers and, more particularly, to aqueous, colored inks containing polyol/alkylene oxide condensates as cosolvents for thermal ink jet printers. These impart resistance to film formation on pen resistors and therefore provide long functional life to thermal ink jet printers.

BACKGROUND OF THE INVENTION

Ink jet printing is a non-impact method that in response to a digital signal produces droplets of ink that are deposited on a substrate such as paper or transparent film. Ink jet printers, especially thermal or bubble jet drop-on-demand printers have found broad application as output for personal computers in the office and the home.

Thermal ink jet printers use a battery of nozzles each containing a resistor element to fire ink droplets toward the print media. With aqueous inks, generated water vapor under pressure expels the droplets of ink. In many versions of thermal printers, a battery of nozzles is contained in a disposable ink cartridge which carries a supply of ink sufficient to allow each nozzle to print many millions of drops. Therefore it is critical that the thermal resistor function uniformly over the long life of the cartridge, i.e., fire millions of drops without a change in heat flux to the ink. Print quality is greatly affected by the degree of heat flux.

Early ink jet devices used organic solvents based inks. In office and home applications these have been largely replaced by primarily water based inks which are safer and environmentally more compatible. These inks are colored most readily with water soluble dyes which have been perfected to resist plugging nozzles.

These dyes have some serious deficiencies. They remain soluble in water on the printed page are therefore subject to leaching by water, for example rain water and coffee. This deters use of ink jet printers in applications such as envelop addressing. Moreover, many of the dyes in use have poor lightfastness and fade even on exposure to fluorescent lighting used in offices.

Pigmented ink jet inks have lightfastness and water fastness advantages over dye-based counterparts, provided the pigment dispersions can be stabilized to flocculation, aggregation or settling.

One major drawback of pigmented inks in thermal drop-on-demand ink jet printers is the formation of a pigmented film on the resistor surface during prolonged printing. The result of this film is the steady and continuous loss of heat transmission to the ink resulting in a steady reduction in ink drop velocity and volume. The phenomena is termed "deceleration". As film builds on the resistor it insulates the surface. This causes a degradation in optical density at normal printing frequencies with the resultant degradation in print quality. When printing a large solid pattern this will result in a loss of optical density as the printer proceeds from the top to the bottom of the page. This phenomena allows for the measurement of deceleration as a degradation in density with prolonged pen firing. (See Section II of Examples). In cases where the situation is severe one observes deceleration as a gradual loss of optical density or fading across a printed line of text. In extreme cases the pen will totally fail to print. In less severe cases where printing can be carried out to millions of drops, the formed film may undergo thermal decomposition which eventually results in resistor malfunction.

A second important requirement for a pigmented ink is freedom from nozzle pluggage. In the case of pigmented inks this can arise from flocculation of the pigment dispersion.

Cosolvents or additives that prevent or retard deceleration must also be compatible with the pigment dispersion and allow for freedom of operation without pluggage. They must also not promote pigment settling as this will produce variation in print quality with the age of the ink cartridge.

Accordingly, a need exists for cosolvents or additives which eliminate film formation on thermal resistor surfaces without destabilizing pigment-based inks.

SUMMARY OF THE INVENTION

The cosolvents claimed in this invention have the ability to prevent film formation on resistor surfaces while maintaining stable pigment dispersions free from premature nozzle pluggage.

In accordance with this invention there is provided an aqueous thermal ink jet ink composition comprising:
(a) an aqueous carrier medium,
(b) a pigment dispersion or dye; and
(c) a cosolvent which is a polyol/alkylene oxide condensate having a solubility in water of at least 4.5 parts in 100 parts of water at 25° C., and is represented by the general formula:

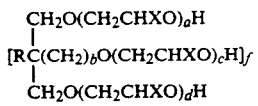

wherein
$X = -H$ or $-CH_3$;
$R = -H, -CH_3, -C_2H_5, -C_3H_7, -C_4H_9,$ or $-CH_2O(CH_2CH_2O)_eH$;
$b = 0$ or 1;
$a+d+f(c+e) = 2-100$; and
$f = 1-6$, the cosolvent being present in the amount of 4.5 to 55% based on the total weight of the ink jet ink composition.

The subject compounds of this invention when used in aqueous pigmented inks as cosolvents eliminate or greatly reduce resistor film formation and therefore deceleration. The use of these cosolvents improves print quality and reliability and raises them to an outstanding level such that tens of millions of drops can be ejected from single nozzles in an ink jet cartridge without degradation in print quality.

These compounds are also compatible with the pigment dispersions. The pigmented ink using them are stable to storage without settling or flocculation. The cosolvents can also be used in dye-based ink jet inks.

DETAILED DESCRIPTION OF THE INVENTION

The compounds of the present invention fill a need for pigmented ink jet inks substantially free from resistor film formation, having excellent pluggage resistance and dispersion stability. These compositions provide pigmented ink jet ink compositions which give uniform print quality and extend the functional life of thermal ink jet printers.

The pigmented inks comprise an aqueous carrier medium, a polyol/alkylene oxide condensate cosolvent and a pigment dispersion which is an aqueous dispersion of pigment particles, stabilized by dispersants, usually polymeric, that are stable over long periods, both in storage and in the printer. The dye-based inks comprise an aqueous carrier medium, a polyol/alkylene oxide condensate cosolvent and a dye. The inks may be adapted to the requirements of a particular ink jet printer to provide a balance of light stability, smear resistance, viscosity, surface tension, high optical density, and crust resistance. The resulting printed images are uniform within a page as well as uniform from page to page.

The aqueous carrier comprises water or a mixture of water and an organic water soluble compound other than the polyol/alkylene oxide condensate compound.

ALKYLENE OXIDE/POLYOL CONDENSATE COSOLVENT

The polyol/alkylene oxide condensate compounds are reaction products of a polyol and an alkylene oxide. They must have a solubility in water of at least 4.5 parts in 100 parts of water at 25° C. are represented by the formula:

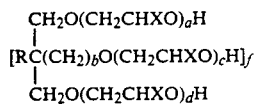

wherein

X = —H or —CH$_3$;
R = —H, —CH$_3$, —C$_2$H$_5$, —C$_3$H$_7$, —C$_4$H$_9$, or —CH$_2$O)CH$_2$CH$_2$O)$_e$H;
b = 0 or 1;
a + d + f(c + e) = 2–100, preferably 10–40, more preferably 19–21 and 25–27; and
f = 1–6

The alkylene oxide is either ethylene or propylene oxide or combinations of both oxides. Reaction with a single alkylene oxide can produces mixtures of compounds with varying degree of oxyalkylation so that the structures illustrated are based on average compositions which many contain a range of alkylene oxide units. Random and block copolymer chains of propylene and ethylene oxides may be employed. For example, a polyol may be reacted first with propylene oxide then in sequence terminated with ethylene oxide. The polyol may contain 3 or more hydroxyl groups. Useful triols used are glycerol, trimethylol propane and trimethylol ethane. Others such as 1,2,4-butanetriol and 1,2,6-hexanetriol may be useful. Pentaerythritol is a useful tetrol. Another is di-(trimethylol propane). Methyl glucosides may be useful tetrols. Glucose may be a useful pentol. Sorbitol is a useful hexol. Other hexols that may be useful are dipentaerythritol and inositol. Diols are not particularly suitable for this invention because their alkylene oxide condensates are generally not compatible with pigment dispersions. One exception may be the alkylene oxide condensates of neopentyl glycol.

Some examples of polyol/alkylene oxide condensates are as follows:

| PRODUCT | R | a + d + f(c + e) | b | f | Supplier |
|---|---|---|---|---|---|
| Liponic ® EG-1 | —H | 26 | 0 | 1 | A |
| Liponic ® SO-20 | —H | 20 | 0 | 4 | A |
| Photonol ® PHO-7149 | —C$_2$H$_5$ | 2.7 | 1 | 1 | B |
| Photonol ® PHO-7155 | —C$_2$H$_5$ | 7.4 | 1 | 1 | B |
| Voranol ® 230-660 | —CH$_3$ | 3.0 | 1 | 1 | C |
| Voranol ® 234-630 | —C$_2$H$_5$ | 3.0 | 1 | 1 | C |
| Fomrez ® K-22-66 | —H | 11.8 | 0 | 4 | D |
| Fomrez ® T-279 | —C$_2$H$_5$ | 3.1 | 1 | 1 | D |
| Fomrez ® T-315 | —C$_2$H$_5$ | 4.1 | 1 | 1 | D |
| Fomrez ® ET-190 | — | 2.2* | — | 1 | D |
| Fomrez ® ET-250 | — | 3.6* | — | 1 | D |

*Based on the assumption that glycerol is the triol.
A: Lipo Chemicals Co., Paterson, NJ 07504
B: Henkel Corporation, Ambler, PA 19002
C: Dow Chemical Co., Midland, MI 48674
D: Witco Corporation, Organics Division, New York, NY.

Preferred cosolvents have a degree of reaction in the range from 2–100 alkylene oxide units. In the case of a triol, a degree of reaction of 2 means that only 2 of the 3 hydroxyl groups are reacted. A more preferred range is 10–40 alkylene oxide units. The optimum amount will depend on the number of hydroxyl groups in the polyol. The more hydroxyl groups, the higher the optimum amount of alkylene oxide units. A discussion of the chemistry of the formation of these compounds are found in R. H. Body and V. L. Kyllingstad, "1,2-Epoxide Polymers" in Encyclopedia of Polymer Science and Engineering, Vol. 6, pp 225–322, 1986, John Wiley, New York.

The polyol/alkylene oxide condensate is present in the amount of at least 4.5%, preferably 5–55%, more preferably 5–25%, still more preferably 5–15%, and still more preferably 5–10%, based on the total weight of the ink jet ink composition. In some cases this may be extended to as high as about 70%. The upper limit for the amount of cosolvent is highly dependent on the viscosity characteristics of the cosolvent. The cosolvents of the invention have a wide range of viscosities which in turn are dependant on the degree of oxyalkylation and the degree of branching which makes the upper limit for the amount of cosolvent difficult to establish. At amounts of less than 4.5–5% deceleration and uniformity of print quality is unacceptable. At higher levels than about 10%, optical density loss may occur due to dilution with the condensate cosolvent that remains in the dried ink film.

Mixtures of various polyol/alkylene oxide condensates may be employed to balance ink properties such as surface tension or viscosity. In this case the mixture of polyol/alkylene oxide condensates total preferably 4.5–55% of the ink composition.

The inks of this invention are free from resistor film formation, have superior decap performance, are extremely stable, have low viscosity, exhibit excellent print quality, and provide excellent water and smear resistance after drying. The aqueous carrier may contain an organic water soluble compound other than the polyol/alkylene oxide condensate.

DISPERSANTS

In addition to, or in place of a polymeric dispersant surfactant compounds may be used as dispersants. These may be anionic, cationic nonionic or amphoteric. A detailed list of non-polymeric as well as some polymer dispersants are listed in the section on dispersants, pp 110–129, 1990 McCutcheon's Functional Materials, North American Edition, Manufacturing Confection Publishing Co., Glen Rock, NJ 07452.

POLYMERIC DISPERSANTS

Polymeric dispersants suitable for practicing the invention include AB or BAB block copolymer wherein the A block is hydrophobic and serves to link with the pigment, and the B block is hydrophilic and serves to disperse the pigment in the aqueous medium. Selection of the polymer for a specific application will depend on the selected pigment and aqueous medium. In general, the polymer is an AB or BAB block copolymer wherein (a) the A segment is a hydrophobic homopolymer or copolymer of an acrylic monomer having the formula:

$$CH_2=C(X)(Y)$$

wherein X is H or $CH_3$; and Y is $C(O)OR_1$, $C(O)NR_2R_3$, or CN, wherein $R_2$ is an alkyl, aryl, or alkylaryl group having 1 to 20 carbon atoms, and $R_2$ and $R_3$ are hydrogen or an alkyl, aryl, or alkylaryl group having 1 to 9 carbon atoms; said A segment having an average molecular weight of at least approximately 300 and being water insoluble; and (b) the B segment is a hydrophilic polymer, or salt thereof, of (1) an acrylic monomer having the formula:

$$CH_2=C(X)(Y_1)$$

wherein X is H or $CH_3$; and $Y_1$ is C(O)OH, $C(O)NR_2R_3$, $C(O)OR_4NR_2R_3$ or $C(OR_5)$; wherein $R_2$ and $R_3$ are hydrogen or an alkyl, aryl, or alkylaryl group having 1 to 9 carbon atoms; $R_4$ is an alkyl diradical having 1 to 5 carbon atoms; and $R_5$ is an alkyl group having 1 to 20 carbon atoms and optionally containing one or more hydroxyl or ether groups; or (2) a copolymer of the acrylic monomer of (1) with an acrylic monomer having the formula:

$$CH_2=C(X)(Y)$$

where X and Y are the substituent groups defined for the A segment; the B segment having an average molecular weight of at least approximately 300 and being water soluble. The B block(s) generally will constitute 10 to 90%, preferably 25 to 65%, of the entire block polymer by weight.

The A block is a polymer or copolymer prepared from at least one acrylic monomer having the formula set forth above. The $R_1$, $R_2$ and $R_3$ groups optionally may contain hydroxy, ether, $OSi(CH_3)_3$ groups, and similar substituent groups. Representative monomers that may be selected include, but are not limited to, the following: methyl methacrylate (MMA), ethyl methacrylate (EMA), propyl methacrylate, n-butyl methacrylate (BMA or NBMA), hexyl methacrylate, 2-ethylhexyl methacrylate (EHMA), octyl methacrylate, lauryl methacrylate (LMA), stearyl methacrylate, phenyl methacrylate, benzyl methacrylate, hydroxyethyl methacrylate (HEMA), hydroxypropyl methacrylate, 2-ethoxyethyl methacrylate, methacrylonitrile, 2-trimethylsiloxyethyl methacrylate, glycidyl methacrylate (GMA), p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, benzyl acrylate, hydroxyethyl acrylate, hydroxypropyl acrylate, acrylonitrile, 2-trimethylsiloxyethyl acrylate, glycidyl acrylate, p-tolyl acrylate, and sorbyl acrylate. Preferred A blocks are homopolymers and copolymers prepared from methyl methacrylate, butyl methacrylate, 2-ethylhexyl methacrylate, or copolymers of methyl methacrylate with butyl methacrylate.

The A block also may contain a hydrophilic monomer such as $CH_2=C(X)(Y)'$, wherein X is H or $CH_3$ and Y' is C(O)OH, $C(O)NR_2R_3$, $C(O)OR_4NR_2R_3$, $C(OR_5)$, or their salts, wherein $R_2$ and $R_3$ may be H or C1 to C9 alkyl, aryl, or alkylaryl, $R_4$ is a C1 to C5 alkyl diradical, and $R_5$ is a C1 to C20 alkyl diradical which may contain hydroxy or ether groups, to provide some changes in solubility. However, there should not be enough hydrophilic monomer present in the A block to render it, or its salt, completely water soluble.

The B block is a polymer prepared from at least one acrylic monomer having the formula provided above. Representative monomers include methacrylic acid (MAA), acrylic acid, dimethylaminoethyl methacrylate (DMAEMA), diethylaminoethyl methacrylate, t-butylaminoethyl methacrylate, dimethylaminoethyl acrylate, diethylaminoethyl acrylate, dimethylaminopropyl methacrylamide, methacrylamide, acrylamide, and dimethylacrylamide. Homopolymers or copolymers of methacrylic acid or dimethylaminoethyl methacrylate are preferred.

The acid containing polymer may be made directly or may be made from a blocked monomer with the blocking group being removed after polymerization. Examples of blocked monomers that generate acrylic or methacrylic acid after removal of the blocking group include: trimethylsilyl methacrylate (TMS-MAA), trimethylsilyl acrylate, 1-butoxyethyl methacrylate, 1-ethoxyethyl methacrylate, 1-butoxyethyl acrylate, 1-ethoxyethyl acrylate, 2-tetrahydropyranyl acrylate, and 2-tetrahydropyranyl methacrylate.

The B block may be a copolymer of an acid or amino containing monomer with other monomers, such as those used in the A block. The acid or amino monomer may be used in a range of 10 to 100%, preferable in a range of 20 to 100%, of the B block composition. The B block(s) generally will constitute 10 to 90%, preferably 25 to 65%, of the entire block polymer by weight.

Block copolymers that are useful in practicing the invention have a number average molecular weight below 20,000, preferably below 15,000, and typically in the range of 1,000 to 3,000. Preferred block copolymers have number average molecular weights in the range of 500 to 1500 for each A and B block.

Representative AB and BAB block polymers that may be selected include the following, wherein the values recited represent the degree of polymerization of each monomer. A double slash indicates a separation between blocks and a single slash indicates a random copolymer. For example, MMA//MMA/MMA 10//5/7.5 is an AB block polymer with an A block of MMA that is 10 monomer units long, molecular weight of 1000 and a B block that is a copolymer of MMA and MAA with 5 monomer units of MMA and 7.5 units of MAA; molecular weight of the B block is 1145.

| | MOL. WEIGHT |
|---|---|
| AB BLOCK POLYMER | |
| EHMA//EHMA/MAA | |
| 3//3/5 | 1618 |

-continued

| | MOL. WEIGHT |
|---|---|
| 5//2.5/2.5 | 1700 |
| 5//5/10 | 2840 |
| 20//10/10 | 6800 |
| 15//11/22 | 7040 |
| EHMA//LMA/MAA | |
| 10//10/12 | 5552 |
| EHMA//MMA/EHMA/MAA | |
| 10//5/5/12 | 4502 |
| EHMA//MMA/MAA | |
| 5//5/10 | 2350 |
| 5//10/10 | 2850 |
| EHMA//MAA | |
| 15//5 | 3400 |
| BMA//BMA/MAA | |
| 5//2.5/2.5 | 1280 |
| 10//5/10 | 3000 |
| 20//10/20 | 6000 |
| 15//7.5/3 | 3450 |
| 5//5/10 | 2300 |
| 5//10/5 | 2560 |
| BMA//MMA/MAA | |
| 15//15/5 | 4060 |
| 15//7.5/3 | 3140 |
| 10//5/10 | 2780 |
| MMA//MMA/MAA | |
| 10//5/10 | 2360 |
| 10//5/5 | 1930 |
| 10//5/7.5 | 2150 |
| 20//5/7.5 | 3150 |
| 15/7.5/3 | 2770 |
| MMA//EHMA/MAA | |
| 5//5/10 | 2350 |
| 10//5/10 | 2850 |
| BMA/MMA//BMA/MAA | |
| 5/5/5/10 | 2780 |
| BMA//MAA | |
| 10//10 | 2260 |
| BMA//HEMA/MAA | |
| 15//7.5/3 | 3360 |
| 7.5//7.5/3 | 2300 |
| 15//7.5/7.5 | 3750 |
| BMA//BMA/DMAEMA | |
| 10//5/10 | 3700 |
| BMA//BMA/DMAEMA/MAA | |
| 10//5/5/5 | 2635 |
| BAB BLOCK POLYMER: | |
| BMA/MAA//BMA//BMA/MAA | |
| 5/10//10//5/10 | 4560 |
| MMA/MAA//MMA//MMA/MAA | |
| 5/7.5//10//5/7.5 | 3290 |

Preferred block polymers are methyl methacrylate/-methyl methacrylate/methacrylic acid (10//5/7.5), 2-ethylhexyl methacrylate//2-ethylhexyl methacrylate/methacrylic acid (5/5/10), n-butyl methacrylate//n-butyl methacrylate/methacrylic acid (10/5/10), n-butyl methacrylate/methacrylic acid (10/10)), ethylhexyl methacrylate//methyl methacrylate/methacrylic acid (5//10/10), n-butyl-methacrylate//2-hydroxyethyl methacrylate/methacrylic acid (5//10/10), n-butylmethacrylate//2-hydroxyethyl methacrylate/methacrylic acid (15//7.5/3), methyl methacrylate//ethylhexyl methacrylate/methacrylic acid (5//5/10), and butyl methacrylate//butyl methacrylate/dimethylaminoethyl methacrylate (10//5/10).

To solubilize the B block into the aqueous medium, it may be necessary to make salts of either the acid or amino groups contained in the B block. Salts of the acid monomers can be made with the counter component being selected from organic bases such as mono-, di-, and tri- methylamine, morpholine, n-methylmorpholine; alcohol amines such as dimethylethanolamine (DMEA), methyldiethanolamine, mono-, di-, and tri-ethanolamine; pyridine; ammonium hydroxide; tetraalkylammonium salts such as tetramethylammonium hydroxide, tetraethylammonium hydroxide; alkali metals such as lithium, sodium and potassium, and the like. Preferred neutralizing agents include dimethylethanolamine and sodium and potassium hydroxides, with potassium hydroxide being particularly preferred for inks to be used in thermal ink jet printers. Salts of the amino monomers can be made with the counter component being selected from organic acids such as acetic acid, formic acid, oxalic acid, dimethylol propionic acid, halogens such as chloride, fluoride, and bromide, and other inorganic acids, such as sulfuric acid, nitric acid, phosphoric acid and the like. It is also possible to convert the amino group into a tetraalkyl ammonium salt. Amphoteric polymers, that is polymer that contains both an acid group and an amino group, may be used as is or can be neutralized with either addition of acid or base.

The AB and BAB polymers can be advantageously produced by stepwise polymerization process such as anionic or group transfer polymerization as described in Webster, U.S. Pat. No. 4,508,880, the disclosure of which is incorporated herein by reference. Polymers so produced have precisely controlled molecular weight, block sizes and very narrow molecular weight distributions. The polymer typically has a dispersity less than 2, generally in the range of 1.0 to 1.4. Dispersity is the polymer weight average molecular weight divided by its number average molecular weight. Number average molecular weight can be determined by gel permeation chromatography (GPC). The AB or BAB block polymers may also be formed by free radical polymerization wherein the initiation unit is comprised of two different moieties which initiate polymerization at two distinctly different temperatures. However, this method may cause contamination of the block copolymers with homopolymer and coupled products.

The AB block polymers also may be prepared using conventional anionic polymerization techniques, in which a first block of the copolymer is formed, and upon completion of the first block, a second monomer stream is started to form a subsequent block of the polymer. A low reaction temperature, e.g., 0° C. to −70° C., is maintained in this case to minimize side reactions and form blocks of the desired molecular weights.

With many of these techniques, and especially with the group transfer polymerization process, the initiator may be non-functional, may contain an acid group (used as is or in a blocked form) or may contain an amino group. Either the hydrophobic A block or the hydrophilic B block may be made first. The BAB block polymers also may be prepared by anionic polymerization or group transfer polymerization techniques by first polymerizing one of the B Blocks, then polymerizing the hydrophobic A block, and then polymerizing the second B Block.

Although random copolymers can be used as dispersants they are not as effective in stabilizing pigment dispersions. Amongst these may be mentioned half-esters of maleic acid/styrene copolymers, lignin sulfonate derivatives and copolymers of acrylic and methacrylic acid with styrene.

COLORANTS

The colorant is preferably a pigment or water-insoluble dye. The colorant may also be a water-soluble dye or a combination of dye and pigment.

PIGMENTS

A wide variety of organic and inorganic alone or in combination, may be selected to make the ink. The term "pigment" as used herein means an insoluble colorant. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 micron. Preferably, the pigment particle size should range from 0.005 to 5 micron, next preferably from 0.005 to 1 micron and, most preferably, from 0.005 to 0.3 micron.

The selected pigment may be used in dry or wet form. For example, pigments are usually manufactured in aqueous media and the resulting pigment is obtained as water wet presscake. In presscake form, the pigment is not aggregated to the extend that it is in dry form. Thus, pigments in water wet presscake form do not require as much deaggregation in the process of preparing the inks from dry pigments. Representative commercial dry pigments that may be used in practicing the invention include the following:

| Pigment Brand Name | Manufacturer | Pigment Color Index |
| --- | --- | --- |
| Permanent Yellow DHG | Hoechst | Yellow 12 |
| Permanent Yellow GR | Hoechst | Yellow 13 |
| Permanent Yellow G | Hoechst | Yellow 14 |
| Permanent Yellow NCG-71 | Hoechst | Yellow 16 |
| Permanent Yellow GG | Hoechst | Yellow 17 |
| Hansa Yellow RA | Hoechst | Yellow 73 |
| Hansa Brilliant Yellow 5GX-02 | Hoechst | Yellow 74 |
| Dalamar ® Yellow YT-858-D | Heubach | Yellow 74 |
| Hansa Yellow X | Hoechst | Yellow 75 |
| Novoperm ® Yellow HR | Hoechst | Yellow 83 |
| Chromophtal ® Yellow 3G | Ciba-Geigy | Yellow 93 |
| Chromophtal ® Yellow GR | Ciba-Geigy | Yellow 95 |
| Novoperm ® Yellow FGL | Hoechst | Yellow 97 |
| Hansa Brilliant Yellow 10GX | Hoechst | Yellow 98 |
| Permanent Yellow G3R-01 | Hoechst | Yellow 114 |
| PV Fast Yellow H2G-01 | Hoechst | Yellow 120 |
| Chromophtal ® Yellow 8G | Ciba-Geigy | Yellow 128 |
| Irgazin ® Yellow 5GT | Ciba-Geigy | Yellow 129 |
| Hostaperm ® Yellow H4G | Hoechst | Yellow 151 |
| Hostaperm ® Yellow H3G | Hoechst | Yellow 154 |
| Hostaperm ® Yellow H6G | Hoechst | Yellow 175 |
| PV Fast Yellow HG | Hoechst | Yellow 180 |
| L74-1357 Yellow | Sun Chem. | |
| L75-1331 Yellow | Sun Chem. | |
| L75-2377 Yellow | Sun Chem. | |
| Hostaperm ® Orange GR | Hoechst | Orange 43 |
| Paliogen ® Orange | BASF | Orange 51 |
| Irgalite ® Rubine 4BL | Ciba-Geigy | Red 57:1 |
| Quindo ® Magenta | Mobay | Red 122 |
| Indofast ® Brilliant Scarlet | Mobay | Red 123 |
| Hostaperm ® Scarlet GO | Hoechst | Red 168 |
| Permanent Rubine F6B | Hoechst | Red 184 |
| Monastral ® Magenta | Ciba-Geigy | Red 202 |
| Monastral ® Scarlet | Ciba-Geigy | Red 207 |
| Heliogen ® Blue L 6901F | BASF | Blue 15:2 |
| Heliogen ® Blue NBD 7010 | BASF | |
| Heliogen ® Blue K 7090 | BASF | Blue 15:3 |
| Heliogen ® Blue L 7101F | BASF | Blue 15:4 |
| Paliogen ® Blue L 6470 | BASF | Blue 60 |
| Heucophthal ® Blue G, XBT-583D | Heubach | Blue 15:3 |
| Heliogen ® Green K 8683 | BASF | Green 7 |
| Heliogen ® Green L 9140 | BASF | Green 36 |
| Monastral ® Violet R | Ciba-Geigy | Violet 19 |
| Monastral ® Red B | Ciba-Geigy | Violet 19 |
| Quindo ® Red R6700 | Mobay | Violet 19 |
| Quindo ® Red R6713 | Mobay | Violet 19 |
| Indofast ® Violet | Mobay | Violet 23 |
| Monastral ® Violet Maroon B | Ciba-Geigy | Violet 42 |
| Monarch ® 1400 | Cabot | Black 7 |
| Monarch ® 1300 | Cabot | Black 7 |
| Monarch ® 1100 | Cabot | Black 7 |
| Monarch ® 1000 | Cabot | Black 7 |
| Monarch ® 900 | Cabot | Black 7 |
| Monarch ® 880 | Cabot | Black 7 |
| Monarch ® 800 | Cabot | Black 7 |
| Monarch ® 700 | Cabot | Black 7 |
| Raven 7000 | Columbian | Black 7 |
| Raven 5750 | Columbian | Black 7 |
| Raven 5250 | Columbian | Black 7 |
| Raven 5000 | Columbian | Black 7 |
| Raven 3500 | Columbian | Black 7 |
| Color Black FW 200 | Degussa | Black 7 |
| Color Black FW 2 | Degussa | Black 7 |
| Color Black FW 2V | Degussa | Black 7 |
| Color Black FW 1 | Degussa | Black 7 |
| Color Black FW 18 | Degussa | Black 7 |
| Color Black S 160 | Degussa | Black 7 |
| Color Black S 170 | Degussa | Black 7 |
| Special Black 6 | Degussa | Black 7 |
| Special Black 5 | Degussa | Black 7 |
| Special Black 4A | Degussa | Black 7 |
| Special Black 4 | Degussa | Black 7 |
| Printex U | Degussa | Black 7 |
| Printex V | Degussa | Black 7 |
| Printex 140U | Degussa | Black 7 |
| Printex 140V | Degussa | Black 7 |
| Tipure ® R-101 | Du Pont | White 6 |

Representative commercial pigments that can be used in the form of a water wet presscake include: Heucophthal ® Blue BT-585-P, Toluidine Red Y (C.I. Pigment Red 3), Quindo ® Magenta (Pigment Red 122), Magenta RV-6831 presscake (Mobay Chemical, Harmon Division, Haledon, N.J.), Sunfast ® Magenta 122 (Sun Chemical Corp., Cincinnati, Ohio), Indo ® Brilliant Scarlet (Pigment Red 123, C.I. No. 71145), Toluidine Red B (C.I. Pigment Red 3), Watchung ® Red B (C.I. Pigment Red 48), Permanent Rubine F6B13-1731 (Pigment Red 184), Hansa ® Yellow (Pigment Yellow 98), Dalamar ® Yellow YT-839-P (Pigment Yellow 74, C.I. No. 11741, Sunbrite ® Yellow 17 (Sun Chemical Corp, Cincinnati, Ohio), Toluidine Yellow G (C.I. Pigment Yellow 1), Pigment Scarlet (C.I. Pigment Red 60), Auric Brown (C.I. Pigment Brown 6), etc. Black pigments, such as carbon black, generally are not available in the form of aqueous presscakes.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

DYES

Dyes commonly used in aqueous ink jet inks include for example Acid, Direct, Food and Reactive dyes.

Some useful dyes that may be mentioned are:
C.I. Food Blacks 1 and 2.
C.I. Acid Blacks 7, 24, 26, 48, 52, 58, 60, 107, 109, 118, 119, 131, 140, 155, 156 and 187.
C.I. Direct Blacks 17, 19, 32, 38, 51, 71, 74, 75, 112, 117, 154, 163 and 168.
C.I. Acid Reds 1, 8, 17, 32, 35, 37, 42, 57, 92, 115, 119, 131, 133, 134, 154, 186, 249, 254, and 256.
C.I. Direct Reds 37, 63, 75, 79, 80, 83, 99, 220, 224 and 227.
C.I. Acid Violets 11, 34 and 75.
C.I. Direct Violets 47, 48, 51, 90 and 94.
C.I. Reactive Reds 4, 23, 24, 31 and 56.
C.I. Acid Blues 9, 29, 62, 102, 104, 113, 117, 120, 175 and 183.
C.I. Direct Blues 1, 6, 8, 15, 25, 71, 76, 78, 80, 86, 90, 106, 108, 123, 163, 165, 199 and 226.
C.I. Reactive Blues 7 and 13.
C.I. Acid Yellows 3, 17, 19, 23, 25, 29, 38, 49, 59, 61 and 72.
C.I. Direct Yellows 27, 28, 33, 39, 58, 86, 100 and 142.
C.I. Reactive Yellow 2.

AQUEOUS CARRIER MEDIUM

The aqueous carrier medium is water or a mixture of water and at least one water soluble organic solvent other than the polyol/alkylene oxide condensate cosolvent.

Deionized water is commonly used. Selection of a suitable mixture of water and water soluble organic solvent, depends on requirements of the specific application, such as desired surface tension and viscosity, the selected pigment, drying time of the pigmented ink jet ink, and the type of paper onto which the ink will be printed.

Representative examples of water-soluble organic solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol, 1,2,6-hexanetriol and 1,2,4-butanediol; (6) lower alkyl mono- or di- ethers derived from alkylene glycols, such as ethylene glycol monomethyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

A mixture of a water soluble organic solvent having at least 2 hydroxyl groups such as, diethylene glycol and water is preferred as the aqueous carrier medium. In the case of a mixture of water, diethylene glycol and polyol/alkylene oxide condensate usually contains from about 30% water///70% solvent//polyol/alkylene oxide condensate mixture to about 92% water///8% solvent//polyol/alkylene oxide condensate mixture. The preferred ratios are approximately 60% water///40% solvent//polyol/alkylene oxide condensate mixture to about 92% water///8% solvent//polyol/alkylene oxide condensate mixture. The solvent//polyol/alkylene oxide condensate mixture contains 15-95%, preferably 25-75%. polyol/alkylene oxide condensate.

Percentages are based on the total weight of the aqueous carrier medium plus alkylene oxide/polyol condensate.

OTHER INGREDIENTS

The ink may contain other ingredients. For example, surfactants may be used to alter surface tension as well as maximize penetration. However, they may also destabilize pigmented inks. Surfactants may be anionic, cationic, amphoteric or nonionic. Useful surfactants may be selected from McCutcheon's Emulsifiers and Detergents, published by Manufacturing Confectioners Publishing Company, Glen Rock, N.J. The choice of surfactant is highly dependent on the type of paper to be printed. It is expected that one skilled in the art can select the appropriate surfactant for the specific paper to be used in printing.

For example, the following surfactants were found to be useful in printing on Gilbert Bond paper (25% cotton) designated style 1057 manufactured by Mead Company, Dayton, Ohio.

| Supplier | Tradename | Description |
| --- | --- | --- |
| Air Products | Surfynol ® 465H | Ethoxylated Tetramethyl Decynediol |
|  | Surfynol ® CT-136 | Acetylenic diol Anionic Surfactant Blend |
|  | Surfynol ® GA | Acetylenic Diol Blend |
|  | Surfynol ® TG | Acetylenic Diol Blend in Ethylene Glycol |
| Cyanamid | Aerosol ® OT | Dioctyl Ester of Sodium Sulfosuccinic Acid |
|  | Aerosol ® MA-80 | Dihexyl Ester of Sodium Sulfosuccinic Acid Mixture of Aerosol ® MA-80/ Aerosol OT 2/1 |
| Du Pont | Duponol ® RA | Fortified Sodium Ether- Alcohol Sulfate |
| Ester | Merpol ® A | Ethylene Oxide, Condensate |
|  | Merpol ® LF-H | Polyether |
|  | Merpol ® SE | Alcohol Ethoxylate |
|  | Merpol ® SH | Ethylene Oxide Condensate |
|  | Zelec ® NK | Alcohol Phosphate |
| Fisher Scientific | Polyethylene Glycol 3350 Polyethylene Glycol 400 Polyethylene Glycol 600 |  |
| ICI | Renex ® 30 | Polyoxyethylene (12) Tridecyl Ether |
|  | Synthrapol ® KB | Polyoxyethylene Alxyl Alcohol |
| Rohm & Haas | Triton ® CF 10 | Alkylaryl Polyether |
|  | Triton ® CF 21 | Alkylaryl Polyether |
|  | Triton ® N-111 | Nonylphenoxy Polyethoxy Ethanol |
|  | Triton ® X-102 | Octylphenoxy Polyethoxy Ethanol |
|  | Triton ® X-114 | Octylphenoxy Polyethoxy Ethanol |
| Union Carbide | Silwet ® L-7600 | Polyalkyleneoxide Modified |

| Supplier | Tradename | Description |
| --- | --- | --- |
| | Silwet ® L-7607 | Polydimethylsiloxane Polyalkyleneoxide Modified |
| | Silwet ® L-77 | Polydimethylsiloxane Polyalkyleneoxide Modified |
| | UCON ® ML1281 | Polydimethylsiloxane Polyalkylene Glycol |
| W. R. Grace Hampshire Div., | Hamposyl ® Lida | Lauryoyl Iminodiacetic Acid |

In aqueous inks, the surfactants may be present in the amount of 0.01-5% and preferably 0.2-2%.

Biocides may be present to inhibit growth of microorganisms. Dowicides ® (Dow Chemical, Midland, Mich. (48674), Omidines ® (Olin Corp., Cheshire, Conn. 06410), Nopcocides ® (Henkel Corp., Ambler, Pa. 19002) Troysans ® (Troy Chemical Corp., Newark, N.J. 17105) and sodium benzoate may be used.

In addition, sequestering agents such as EDTA may also be included to eliminate deleterious effects of heavy metal impurities.

INK PREPARATION

The pigmented ink is prepared by premixing the selected pigment(s) and dispersant in water. In the case of dyes some of the same factors apply except that there is no dispersant present and no need for pigment deaggregation. The dye-based ink is prepared in a well agitated vessel rather than in dispersing equipment. Polyol/alkylene oxide condensates as well as other cosolvents may be present during the dispersion.

The dispersing step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous carrier medium.

It is generally desirable to make the pigmented ink jet ink in concentrated form. The concentrated pigmented ink jet ink, which is subsequently diluted to the appropriate concentration for use in the ink jet printing system. This technique permits preparation of a greater quantity of pigmented ink from the equipment. If the pigment dispersion is made in a solvent, it is diluted with water and optionally other solvents to obtain the appropriate concentration. If the pigment dispersion is made in water, it is diluted with either additional water or water soluble solvents to make a pigment dispersion of the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.1 to 15%, preferably approximately 0.1 to 8%, by weight of the total ink composition for most thermal ink jet printing applications. If an inorganic pigment is selected, the ink will tend to contain higher weight percentages of pigment than with comparable inks employing organic pigment, and may be as high as approximately 75% in some cases, because inorganic pigments generally have higher specific gravities than organic pigments. The acrylic block polymer is present in the range of approximately 0.1 to 30% by weight of the total ink composition, preferably in the range of approximately 0.1% to 8%. If the amount of polymer becomes too high, the ink color density will be unacceptable and it will become difficult to maintain desired ink viscosity. Dispersion stability of the pigment particles is adversely affected if insufficient acrylic block copolymer is present. The amount of aqueous carrier medium plus polyol/alkylene oxide cosolvent is in the range of approximately 70 to 99.8%, preferably approximately 94 to 99.8%, based on total weight of the ink when an organic pigment is selected, approximately 25 to 99.8%, preferably and approximately 70 to 99.8% when an inorganic pigment is selected and 80 to 99.8% when a dye is selected.

Other additives, such as surfactants, biocides, humectants, chelating agents, and viscosity modifiers may be added to the ink. Optionally, other acrylic and non-acrylic polymers, may be added to improve properties such as water fastness and smear resistance.

Jet velocity, separation length of the droplets, drop size, and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 70 dyne/cm. Acceptable viscosities are no greater than 20 cP, and preferably in the range of about 1.0 cP to about 10.0 cP. The ink has physical properties compatible with a wide range of ejecting conditions, i.e., driving voltage and pulse width for thermal ink jet printing devices. Whereas the ink is designed to eliminate deceleration in a thermal ink jet printer, it can be modified to operate in a piezielectric drop-on-demand printer or a continuous printer. The inks have excellent storage stability for a long period and do not clog in an ink jet apparatus. Fixing the ink on the image recording material, such as, paper, fabric, film, etc., can be carried out rapidly and accurately.

The printed ink images have clear color tones, high and uniform optical density, excellent water resistance and lightfastness and remain so over the life of the ink cartridge. Furthermore, the ink does not corrode parts of the ink jet printing device it comes in contact with, and it is essentially odorless and non-toxic.

This invention will now be further illustrated, but not limited, by the following examples.

EXAMPLES

I. Dispersant Preparation

A block copolymer of n-butyl methacrylate and methacrylic acid was prepared as follows:

3750 grams of tetrahydrofuran, 7.4 grams of p-xylene, were added to a 12-liter flask equipped with a mechanical stirrer, thermometer, nitrogen inlet, drying tube outlet, and addition funnels. The catalyst, tetrabutyl ammonium m-chlorobenzoate, and 3.0 ml of a 1.0M solution in acetonitrile, were then added to the flask. 291.1 grams (1.25M) of an initiator, 1,1-bis(trimethylsiloxy)-2-methyl propene, were injected. Feed I which consisted of tetrabutyl ammonium m-chlorobenzoate, and 3.0 ml of a 1.0M solution in acetonitrile, was started and added over 150 minutes. Feed II which consisted of 1976 gm (12.5M) trimethylsilyl methacrylate, was started at 0.0 minutes and added over 35 minutes. One hundred eighty minutes after Feed II was completed over 99% of the monomers had reacted. Feed III, which consisted of 1772 gm (12.5M) butyl methacrylate, was started and added over 30 minutes.

At 400 minutes, 780 grams of dry methanol were added to the above solution and distillation commenced. During the first stage of distillation, 1300.0 grams of material with a boiling point below 55° C. were removed from the flask. The theoretical amount of methoxytrimethylsilane, having a boiling point of 54° C., to be removed was 1144.0 grams. Distillation continued during the second stage while the boiling point increased to 76° C. 5100 gms of isopropanol were added during the second stage of distillation. A total of 7427 grams of solvent were removed. The resultant resin solution was used directly in the next step. It contained 50% solids and had a neutralization equivalent of 4.65 milliequivalents of potassium hydroxide per gram of solids.

II. Preparation of Pigment Dispersions

A. Procedure 1:,

The following materials were added to a 1000 ml cylindrical polyethylene bottle:

| | |
|---|---|
| 200.0 grams | dispersant solution |
| 174.4 grams | 15% potassium hydroxide |
| 137.6 grams | deionized water |

The mixture was tumbled on a roller mill for 3–4 hours and then magnetically stirred for 16–20 hours to give a slightly cloudy solution.

The following materials were added to a 1 liter beaker:

| | |
|---|---|
| 73.8 grams | deionized water |
| 66.7 grams | neutralized dispersant solution |
| 3.0 grams | 15% potassium hydroxide |

The solution was mechanically stirred while 20.0 grams of carbon black pigment, FW 18 (Degussa Corp., Ridgefield Park, N.J. 07660) were added in portions. Stirring was continued for 30 minutes. The contents were then added to a Mini Motormill 100 (Eiger Machinery Inc., Bensenville, Ill. 60106) with another 32 grams of deionized water as a rinse. The contents were milled at 3500 rpm for one hour. The yield was 190.8 grams. The pH was 7.6. The particle size was 138 nm as determined by a Brookhaven BI-90 Particle analyzer (Brookhaven Instruments Corp., Holtsville, N.Y. 11742).

B. Procedure 2:

In a mixer equipped with a close fitting paddle agitator there was added sequentially:

| | |
|---|---|
| 1013 grams | deionized water |
| 227 grams | potassium hydroxide pellets |

Solution was completed by stirring 15 minutes. To this was added sequentially:

| | |
|---|---|
| 7627 grams | deionized water |
| 1900 grams | resin solution described in I. |

The mixture was stirred for 2 hours to complete the neutralization which was 78% of the theoretical acid groups. To this was added over 1 hour with agitation:

| | |
|---|---|
| 1900 grams | Degussa Colour Black FW 18 (Degussa Corp., Allendale, NJ, 07401) |

Stirring was continued for 30 minutes. At this point was added:

| | |
|---|---|
| 6333 grams | deionized water |

Agitation was continued for 15 minutes to give a slurry which contains 10% pigment and 5% dispersant. The mixture was transferred to a 1.4 liter Dynomill ® media mill (Chicago Boiler Co., Lincolnshire, Ill. 60069) equipped with 5 discs and a 90% volumetric loading of 0.8 mm glass beads. The premix was processed for 7 passes at a rate of 144 seconds/8 fluid ounces and a tip speed of 14 meters/second.

III. Preparation of Inks

A. Liponic EG-1 and Hydroxypivalyl Hydroxypivalate

These inks all contain 3.5% pigment, 1.75% dispersant and 1.9% hydroxypivalyl hydroxypivalate. The ink preparation with 1.9% Liponic EG-1 is described. When larger than 1.9% amounts of Liponic EG-1 are used the water added is reduced so that the total weight of ink is 100 grams.

A solution was prepared by magnetically stirring the following ingredients until a clear solution was obtained:

| | |
|---|---|
| 61.2 g | water |
| 1.9 g | Liponic EG-1 (Lipo Chemicals Co., Paterson, NJ 07504) |
| 1.9 g | hydroxypivalyl hydroxypivalate (Eastman Chemical Products, Inc., Kingsport, TN, 37662) |

This solution was added dropwise from a buret to 35.0 g of pigment dispersion (IIb.) which was being rapidly stirred on a magnetic stirrer.

The concentration of Liponic EG-1 was varied from 1.9 to 19%.

B. Liponic EG-1, Diethylene Glycol and Silwet ® L-77

A solution was prepared by magnetically stirring the following ingredients until a clear solution was obtained:

| | |
|---|---|
| 54.6 g | water |
| 4.7 g | Liponic EG-1 |
| 4.7 g | Diethylene glycol (Aldrich Chemical Co., Inc., Milwaukee. WI 53233) |
| 0.95 g | Silwet ® L-77 (Union Carbide Co., Stamford, CO) |

This solution was added dropwise from a buret to 35.0 g of pigment dispersion (IIa.) which was being rapidly stirred on a magnetic stirrer.

C. Liponic SO-20 and Hydroxypivalyl Hydroxypivalate

A solution was prepared by magnetically stirring the following ingredients until a clear solution was obtained:

| | | |
|---|---|---|
| 55.5 g | water | |
| 7.1 g | Liponic SO-20 (Lipo Chemicals Co., Paterson, NJ 07504) | |
| 2.4 g | hydroxypivalyl hydroxypivalate | |

This solution was added dropwise from a buret to 35.0 g of pigment dispersion (IIb.) which was being rapidly stirred on a magnetic stirrer.

IV. Testing of Inks

A. Deceleration

The inks were printed as a large solid rectangle covering most of an 8.5 by 11 inch paper sheet of Gilbert bond paper, designated style 1057 (Mead Co., Dayton, Ohio). Printing was carried out on a Hewlett-Packard DeskJet Printer (Hewlett-Packard Co., Vancouver, Wash. 98668). The optical densities reported in OD units were obtained on a Macbeth RD 917 densitometer (Kollmorgen Co., Newburgh, N.Y.). Two sets of density values were measured at the left hand sides of the top and bottom of the printed solid patch. The difference in the two numbers is used to gauge the deceleration or film formation performance of test formulations. The top and the bottom of each patch was averaged individually to yield the optical density values listed in Table I:

TABLE I

| Optical | % Cosolvent | | Optical Densities (top) | (bottom) | Difference in Density |
|---|---|---|---|---|---|
| IIIA | 1.9% (Control) | Liponic EG-1 | 1.17 | 1.07 | −0.10 |
| | 3.8 (Control) | " | 1.21 | 1.14 | −0.07 |
| | 5.7 | " | 1.22 | 1.19 | −0.03 |
| | 7.6 | " | 1.22 | 1.19 | −0.03 |
| | 9.5 | " | 1.18 | 1.15 | −0.03 |
| A second round of testing gave the following results: | | | | | |
| | 3.8% (Control) | Liponic EG-1 | 1.08 | 1.01 | −0.07 |
| | 4.7 | " | 1.18 | 1.17 | −0.01 |
| | 19.0 | " | 0.76 | 0.77 | +0.01 |
| IIIB | | Liponic EG-1 | 1.14 | 1.15 | +0.01 |
| IIIC | | Liponic SO-20 | 1.17 | 1.16 | −0.01 |

Uniform optical densities are obtained in the range of values somewhere between 3.8 and 4.7% Liponic EG-1. At concentrations above 9.5% absolute optical densities decrease due to a dilution effect, but uniformity remains excellent.

Dispersion Stability:

Dispersion stability was obtained by subjecting samples of ink to four temperature cycles, each consisting of 4 hours at −20° C. and 4 hours at 60° C. Particle sizes were measured on a Brookhaven BI-90 (Brookhaven Instruments Corp., Holtsville, N.Y. 11742) before and after cycling.

Data is given in Table II:

TABLE II

| Sample | | | Change in Particle Size, delta nanometers |
|---|---|---|---|
| IIIA | 1.9% | Liponic EG-1 | 0 nm |
| | 3.8 | " | 7 |
| | 5.7 | " | 8 |
| | 7.6 | " | −2 |
| | 9.5 | " | −3 |

The inks have excellent print quality being sufficient in optical density and having excellent character resolution and edge acuity.

What is claimed is:

1. An aqueous ink jet ink composition comprising:
   (a) an aqueous carrier medium,
   (b) a pigment dispersion or dye; and
   (c) a cosolvent which is a polyol/alkylene oxide condensate having a solubility in water of at least 4.5 parts in 100 parts of water at 25° C. and represented by the general formula:

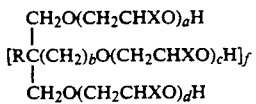

wherein X=—H or —CH$_3$;
R=—H, —CH$_3$, —C$_2$H$_5$, —C$_3$H$_7$, —C$_4$H$_9$, or —CH$_2$O(CH$_2$CH$_2$O)$_e$H;
b=0 or 1;
a+d+f(c+e)=2−100; and
f=1−6, the cosolvent being present in the amount of at least 4.5% to 70% based on the total weight of the ink jet ink composition.

2. The ink composition of claim 1 wherein the pigment dispersion comprises a pigment and a dispersant.

3. The ink composition of claim 2 wherein the dispersant is a polymeric dispersant.

4. The ink composition of claim 1, 2 or 3 wherein a+d+f(c+e)=10−40.

5. The ink composition of claim 1, 2 or 3 wherein a+d+f(c+e)=19−21.

6. The ink composition of claim 1, 2 or 3 wherein a+d+f(c+e)=25−27.

7. The ink composition of claim 1, 2 or 3 wherein X=—CH$_3$.

8. The ink composition of claim 3 wherein X=—H.

9. The ink composition of claim 1 or 3 wherein f=1−4.

10. The ink composition of claim 9 wherein f=1.

11. The ink composition of claim 9 wherein f=4.

12. The ink composition of claim 1, 2 or 3 wherein b=0.

13. The ink composition of claim 1, 2 or 3 wherein b=1.

14. The ink composition of claim 1, 2 or 3 wherein R=—H.

15. The ink composition of claim 1, 2 or 3 wherein R=—CH$_3$ or —C$_2$H$_5$.

16. The ink composition of claim 1, 2 or 3 wherein R=—CH$_2$O(CH$_2$CH$_2$O)$_e$H.

17. The ink composition of claim 1, 2 or 3 wherein X=—H, R=—, f=1 and b=0.

18. The ink composition of claim 1, 2 or 3 wherein X=—H, R=—CH$_3$, or —C$_2$H$_5$, f=1 and b=1.

19. The ink composition of claim 1, 2 or 3 wherein X=—H, R=—, f=4 and b =0.

20. The ink composition of claim 17 wherein the polyol/alkylene oxide condensate is the reaction product of glycerol with 26 moles of ethylene oxide.

21. The ink composition of claim 19 wherein the polyol/alkylene oxide condensate is the reaction product of sorbitol with 20 moles of ethylene oxide.

22. The ink composition of claim 1, 2 or 3 wherein the polyol/alkylene oxide condensate is about 5–55% based on the total weight of the ink jet ink composition.

23. The ink composition of claim 22 wherein the polyol/alkylene oxide condensate is present in the amount of 5-25% based on the total weight of the ink jet ink composition.

24. The ink composition of claim 23 wherein the polyol/alkylene oxide condensate is present in the amount of 5-15% based on the total weight of the ink jet ink composition.

25. The ink composition of claim 24 wherein the polyol/alkylene oxide condensate is present in the amount of 5-10% based on the total weight of the ink jet ink composition.

26. The pigmented ink composition of claim 3 wherein the dispersant is an AB or BAB block copolymer wherein
   (a) the A segment is a hydrophobic homopolymer or copolymer of an acrylic monomer having the formula:

$$CH_2=C(X)(Y)$$

wherein X is H or $CH_3$; and Y is $C(O)OR_1$, $C(O)NR_2R_3$, or CN, wherein $R_2$ is alkyl, aryl, or alkylaryl group having 1 to 20 carbon atoms, and $R_2$ and $R_3$ are hydrogen or an alkyl, aryl or alkylaryl group having 1 to 9 carbon atoms; said A segment having an average molecular weight of at least approximately 300 and being water insoluble; and
   (b) the B segment is a hydrophilic polymer, or salt thereof, of
   (1) an acrylic monomer having the formula:

$$CH_2=C(X)(Y_1)$$

wherein X is H or $CH_3$; and $Y_1$ is C(O)OH, $C(O)NR_2R_3$, $C(O)OR_4NR_2R_3$ or $C(OR_5)$; wherein $R_2$ and $R_3$ are hydrogen or an alkyl, aryl or alkylaryl group having 1 to 9 carbon atoms; $R_4$ is an alkyl diradical having 1 to 5 carbon atoms; and $R_5$ is an alkyl group having 1 to 20 carbon atoms and optionally containing one or more hydroxyl or ether groups; or
   (2) a copolymer of the acrylic monomer of (1) with an acrylic monomer having the formula:

$$CH_2=C(X)(Y)$$

wherein X and Y are the substituent groups defined above for the A segment; the B segment having an average molecular weight of at least approximately 300 and being water soluble.

27. The pigmented ink composition of claim 26 wherein the polymeric dispersant is an AB or BAB block copolymer wherein the A segment of said block copolymer is a homopolymer or copolymer prepared from at least one monomer selected from the group consisting of methyl methacrylate, ethyl methacrylate, propyl methacrylate, methacrylate, hexyl methacrylate, 2-ethylhexyl methacrylate, octyl methacrylate, lauryl methacrylate, stearyl methacrylate, phenyl methacrylate, benzyl methacrylate, hydroxyethyl methacrylate, hydroxypropyl methacrylate, 2-ethoxyethyl methacrylate, methacrylonitrile, 2-trimethylsiloxyethyl methacrylate, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, benzyl acrylate, hydroxyethyl acrylate, hydroxypropyl acrylate, acrylonitrile, 2-trimethyl-siloxyethyl acrylate, glycidyl acrylate, p-tolyl acrylate, and sorbyl acrylate.

28. The pigmented ink composition of claim 26 wherein the B segment of said block copolymer is a homopolymer or copolymer prepared from at least one monomer selected from the group consisting of methacrylic acid, acrylic acid, dimethylaminoethyl methacrylate, diethylaminoethyl methacrylate, t-butylaminoethyl methacrylate, dimethylaminoethyl acrylate, diethylaminoethyl acrylate, dimethylaminopropyl methacrylamide, methacrylamide, acrylamide, and dimethylacrylamide.

29. The pigmented ink composition of claim 3 wherein said ink contains approximately 0.1 to 15% pigment, 0.1 to 30% polymeric dispersant, and 55 to 99.8% aqueous carrier medium plus polyol/alkylene oxide condensate.

30. The pigmented ink composition of claim 1, 2 or 3 wherein the aqueous carrier medium comprises water and at least one water soluble organic solvent.

31. The ink composition of claim 30 wherein aqueous carrier medium plus polyol/alkylene oxide condensate contains from 30% water///70% solvent//polyol/alkylene oxide condensate mixture to 92% water///8% solvent//polyol/alkylene oxide condensate mixture.

32. The ink composition of claim 31 wherein the solvent//polyol/alkylene oxide condensate mixture contains 15-95% polyol/alkylene oxide condensate.

33. The ink composition of claim 32 wherein the solvent//polyol/alkylene oxide condensate mixture contains 25-75% polyol/alkylene oxide condensate.

34. The ink composition of claim 29 wherein said ink contains approximately 0.1 to 8% pigment, 0.1 to 8% polymeric dispersant, and 84 to 99.8% aqueous carrier medium plus polyol/alkylene oxide condensate.

35. The pigmented ink composition of claim 26 wherein the B segment(s) constitute approximately 25 to 65%, by weight, of said block copolymer.

36. The ink composition of claim 30 wherein the aqueous carrier medium is a mixture of water and at least one water soluble organic solvent having at least 2 hydroxyl groups.

37. The pigmented ink composition of claim 3 wherein the pigment particles have a median particle size of approximately 0.005 to 1 micron.

38. The pigmented ink composition of claim 26 wherein the B segment is neutralized with a neutralizing agent selected from the group consisting of organic bases, alkanolamines, alkali metal hydroxides, and mixtures thereof.

39. The ink composition of claim 1, 2 or 3 wherein a surfactant is present.

40. The ink composition of claim 1 wherein the colorant is a dye and wherein the polyol/alkylene oxide condensate is about 5-55% based on the total weight of the ink jet ink composition.

41. The ink composition of claim 40 wherein the polyol/alkylene oxide condensate is present in the amount of 5-25% based on the total weight of the ink jet ink composition.

42. The ink composition of claim 41 wherein the polyol/alkylene oxide condensate is present in the amount of 5-15% based on the total weight of the ink jet ink composition.

43. The ink composition of claim 42 wherein the polyol/alkylene oxide condensate is present in the amount of 5-15% based on the total weight of the ink jet ink composition.

* * * * *